United States Patent [19]
Kroman

[11] Patent Number: 5,920,369
[45] Date of Patent: Jul. 6, 1999

[54] SHIELD FOR CLIPPING ONTO A PAIR OF EYEGLASSES

[75] Inventor: Flemming Kroman, Brabrand, Denmark

[73] Assignee: Lindberg Optic Design A/S, Denmark

[21] Appl. No.: 08/947,623

[22] Filed: Oct. 9, 1997

Related U.S. Application Data

[63] Continuation-in-part of application No. PCT/DK96/00040, Jan. 24, 1996, abandoned.

[30] Foreign Application Priority Data

Apr. 21, 1995 [DK] Denmark ................................ 0471/95

[51] Int. Cl.$^6$ ........................................................ G02C 9/00
[52] U.S. Cl. ................................................ 351/47; 351/57
[58] Field of Search ................................ 351/47, 48, 57, 351/58, 44, 41, 158, 111

[56] References Cited

U.S. PATENT DOCUMENTS 3,600,069 8/1971 McNeill .
4,890,910 1/1990 Gazeley .
4,955,707 9/1990 Gazeley ................................... 351/47

FOREIGN PATENT DOCUMENTS 1519726 1/1990 France .
9324856 12/1993 WIPO .

Primary Examiner—Hung Xuan Dang
Attorney, Agent, or Firm—Thomas R. Vigil

[57] ABSTRACT

A clip-on shield (6) for spectacles (1) adapted for securing shield lenses (7) in front of the lenses (4) of the spectacles is provided with a connecting bridge (8) between the lenses provided with an engagement tongue (12) that engages behind the connecting bridge (3) of the spectacles, and is designed to transmit force from the shield which is oriented centrally relative to the symmetrical plane of the spectacles. The shield is guided by the abutment of a friction surface at each shield lens on the front of the spectacles and optionally by a guide pin (9) at each shield lens, said guide pin engaging with the spectacles. A spring means is arranged to bias the engagement tongue against the back of the spectacle's connecting bridge and the shield lenses towards the front of the frame of the spectacles.

15 Claims, 1 Drawing Sheet

SHIELD FOR CLIPPING ONTO A PAIR OF EYEGLASSES

CROSS-REFERENCE TO RELATED APPLICATION

This is a continuation-in-part of international application PCT/DK96/00040, with an international filing date of Jan. 24, 1996, now abandoned.

This application is based on application No. 04-71/95 filed in Denmark on Apr. 21, 1995, the contents of which are incorporated hereinto by reference.

FIELD OF THE INVENTION

The present invention relates to a clip-on shield for spectacles wherein the shield is secured to the spectacles by means of a clip-on device to allow occasional use thereof over ordinary lenses.

The term "spectacles" is used herein to designate the well known optical accessory which basically comprises a pair of lenses made from glass or other refractive material, usually made according to an optician's prescription and intended for being worn by a wearer in order for him to enjoy an optically corrected view by seeing through them and provided with fitting means for conveniently securing said lenses in the preferred in-use position in which the wearer is offered the possibility of looking straight through both respective lenses while both eyes have parallel directions of vision.

The invention relates to spectacles of the most common type where the fitting means comprise a bridge intended for extending across the bridge of the wearer's nose and for mutually securing the lenses. Since, relative to a straightforward direction of vision, the lenses are substantially vertical and perpendicular whereas the bridge of the wearer's nose inclines forwardly and downwardly, the nose bridge is often constructed to arch forwards and upwards over the bridge of the wearer's nose in an inclined manner.

However, the invention is also relevant to other embodiments of the nose bridge, e.g. an embodiment wherein the bridge is in the form of a substantially rectilinear bar as it may also be e.g. in case of spectacles supported at the sides of the wearer's nose. Moreover, the most common spectacles are provided with hinged lateral temple bars adapted to fit over the ears of the wearer. The invention may be used as an accessory for such types of spectacles but the underlying principle is not restricted to application over spectacles with ordinary temple bars.

Occasionally a bespectacled person may want to use a pair of auxiliary lenses together with his or her spectacles, most often a pair of tinted lenses adapted for reducing sunglare. Although such items are referred to herein as lenses, it is noted that they do not necessarily include optically refractive means, in most cases they rather include some type of optical filters known in the art.

In order to provide means for allowing such use of auxiliary lenses by bespectacled persons, it is known to produce detachable shields for spectacles, i.e. fitting means with shield lenses provided for detachable fastening onto the spectacles in such a manner that the shield lenses are secured in a position to substantially cover the ordinary lenses. Such a shield essentially comprises the two shield lenses, a bridge constructed to arcuate over the wearer's nose and means for detachable fitting of the shield acccessory over the spectacles.

THE PRIOR ART

DE patent No. 27 18 445 teaches an accessory shield which comprises two clips or clamps arranged to allow the accessory shield to be shifted downwards over the spectacles from above and constructed to obtain flexible securing by means of tongues which engage with and squeeze the front and the back of each of the lenses in a substantially vertically extending area close to the wearer's nose. Each of the clips is further provided with a connecting branch which may abut on a top frame portion of the spectacles.

Although simple and commonly used, shields of this general type are associated with certain drawbacks. From an aesthetical point of view, they are rarely accomplished since they easily slide and become awry. Usually, the abutment on the top frame of the spectacles is not sufficient to ensure stable centering and orientation, since most often the top frame of the spectacles extends in a curved manner which increases the shield's propensity to slide sideways. If such a shield is to fit over any among a range of spectacles where the space width between the inner rims of the lenses and the corresponding rims of the frame, respectively, varies, the distance between the clips must be adjusted to fit the wider. Hereby the clips will extend relatively far into the lenses of the majority of spectacles where the rim spacing is average or below average.

Moreover, it is difficult to ensure stable fitting of the flexible clips onto all thicknesses of frames and lenses, and since different wearers wear different thicknesses of frames and lenses, some wearers are unable to use shields with this type of fastening means.

During mounting and dismounting the flexible clips are to slide up and down over the support areas in the full vertical extent of the clip which involves a risk of scratching both the front and the back of the lenses. Often, the movement becomes irregular with sideways displacements due to the two spring clips having engaged with each their lens. This means that the area exposed to such scratching is comparatively large. Normally this does not present a problem in case of lenses made of glass but it is unacceptable in case of lenses made from plastics.

Since, however, many wearers prefer plastic lenses, e.g. because they favor the reduced weight or the shatterproofness they exhibit, fastening means which do not cause scratching problems are very much in demand.

U.S. Pat. No. 2,949,609 teaches a shield accessory wherein the fastening means essentially comprises a rectiliniear bar with two hooks arranged at a distance from each other for hinging over the top rims of the respective lenses and having a centrally arranged hook for engaging below the nose bridge. The hooks may be elastic to obtain completely stable positioning. A shield accessory of this kind presupposes that the hooks match the relevant thickness of the lenses and the nose bridge exactly and also the actual position of the bridge relative to the top rim of the lenses or the frame on which the lateral hooks abut. Thus, a shield made in this way is not universally applicable for a wide variety of spectacles.

EP patent application 0 238 479 teaches a shield accessory for spectacles intended for spectacles where the connecting bridge comprises two parallel cross bars and wherein the fastening means of the shield accessory comprises a clip which is squeezed into position around the two bars of the connecting bridge of the spectacles at the back, the top and the bottom to establish firm engagement. The fastening clip has sides which abut closely on the innermost side rims of the lenses whereby complete fixation of the fastening clip of the accessory relative to the spectacles is obtained. However, this kind of solution is applicable only to this particular type of spectacles.

SUMMARY OF THE INVENTION

The present invention provides a clip-on shield for spectacles, which spectacles comprise a spectacle connecting bridge, a spectacle frame and a pair of spectacle lenses, said shield comprising a pair of shield lenses, a clip-on device whereby said shield may be secured to the spectacle connecting bridge to allow occasional use of said shield in combination with the spectacles, a shield connecting bridge, structurally connected with said pair of shield lenses and provided with an engagement tongue which engages behind the spectacle connecting bridge, and is designed to transmit a force from the pair of shield lenses, which force is oriented centrally relative to the symmetrical plane of the spectacles, an friction surface at each shield lens of said pair of shield lenses to abut on the front of the spectacles, and a spring means arranged for biasing said engagement tongue against the back of the spectacle connecting bridge and each said shield lens towards the front of the spectacle frame or spectacle lenses in such a manner that the orientation and positioning of said shield is determined by the engagement of said friction surface at each said shield lens.

This construction represents a major departure from the traditional ways of securing the shield fastening means and connecting bridge. The principle underlying the fastening means according to the invention provides a centrally engaging, backwardly oriented force which urges the shield into abutment on the front of the spectacles so as to force the lenses of the shield backwardly towards the front of the lenses of the spectacles or their frame. This biasing force prevents the shield from tipping about axes along the lens fronts and concurrently it prevents rotation about the axis perpendicular to the front of the spectacles and displacement in the plane of the lenses, including displacement due to gravity, by means of friction of abutment or optionally by means of guide pins which engage with the rims of the spectacles. The shield according to the invention may be implemented as a very light construction and may in a simple manner be adapted to a very wide variety of lenses and spectacles.

When guide pins are used, they need not engage behind the frames or the lenses, and consequently they may easily be dimensioned to match the relevant spectacles completely irrespective of the thicknesses of frame or lenses. Since the spring means engages centrally at the nose bridge of the spectacles, the shield is readily detached by manually influencing the engagement point whereby the shield may simultaneously be guided with the fingers to prevent it from tipping during the detachment operation, which is important to reduce the risk of scratching the lenses. The backs of the lenses are not directly influenced at any time, and thus they are not exposed to the risk of scratching.

According to a preferred embodiment, the abutment surface comprises a spacer element with a friction surface arranged at each shield lens. The spacer elements are preferably so arranged that they are capable of engaging with the lenses of the spectacles at a point close to the rim whereby any inconvenience caused by scratching is minimized. The spacer elements prevent the surfaces of the shield lenses from abutting on the lens fronts whereby the risk of scratching produced by dust particles between the two pairs of lenses, viz the corrective pair and the tinted pair, is minimized. In their resting state, the spacer elements need not touch the front of the spectacles since the abutment pressure may be transmitted in areas of the shield lenses which are at a distance from the spacer elements. In that case the spacer elements serve the purpose of preventing surface abutment in those cases where additional forces are applied onto the shield, e.g. during handling, or in case the shield or the spectacles are deformed in such a manner that there is a risk of surface abutment.

According to a preferred embodiment the engagement tongue is constructed to be supported by the top of the connecting bridge of the spectacles and serves to stop the downward movement of the shield. In this case the shield may be detached by an upward movement which overcomes the spring force. As explained above, the abutment on the top realised in this embodiment is not necessary to support the shield, but it is convenient for the mounting of the shield since it allows the shield to be fitted by downwards pushing thereof into a position which is positively defined by this support.

According to a preferred embodiment, the engagement tongue of the shield is designed to engage in a snap-locking manner behind the connecting bridge of the spectacles upon mounting from above. Hereby convenient and quick mounting or detachment of the shield is obtained as well as a tactile indication of the correct position.

The invention further provides a shield for spectacles, which spectacles comprise a spectacle frame, a pair of spectacle lenses and a spectacle connecting bridge between the lenses in the form of a substantially upwardly and forwardly inclining arched bow and with temple bars, said shield comprising a shield connecting bridge adapted to straddle on the bow by virtue of two engagement areas which are mutually symmetrical about the symmetrical plane of the spectacles and in such a manner that each said engagement area presents a substantially U-shaped engagement abutting on the front, the back and the outside of the bow, and a locking tongue which engages below the bow somewhere between the engagement areas.

The engagement on the back of the bow transmits the shield biasing force to the bow. The engagement on the front restricts the movement of the shield during exposure to downward influences, and in combination with the other engagements, the engagement on the front ensures that the shield is caused to occupy a fully defined position when pressed downwards during fitting operations. When the bow is oriented upwards and inclines forwards, the biasing force engaging below the bow will in itself center the shield to provide a positive determination of its position which does not rely on other portions of the spectacles. In this embodiment, it is in principle only fixation of the shield to prevent tipping about axes through the engagement point that is effected by the friction abutment and/or the engagement of the guide pins.

According to a preferred embodiment the shield is provided with a soft coating or padding on the portion which extends behind the connecting bridge of the spectacles. This will protect the connecting bridge of the spectacles from harmful influences and it will improve wearer comfort.

According to a preferred embodiment, the shield comprises a coating or a soft padding on the friction surfaces of the spacer elements. Thereby an abutment is provided which protects the lenses and allows the shield to span even wider dimensioning tolerances while still in its correct position.

According to a preferred embodiment the shield comprises additional guide pins at those portions of the shield lenses which are adapted to he located adjacent the fastening means of the temple bars. This provides good support of the shield lenses using the temple bar fastening means for mating engagement and ensures an aesthetically accomplished solution where the pins blend optically with the fastening means of the temple bars.

According to a preferred embodiment, the shield comprises a protrusion which protrudes before the connecting bridge of the spectacles. This provides improved finger grip during fitting and detachment, and it provides a protrusion which may conveniently be used to push the entire optical assembly upwards—a movement proved in practice to be performed frequently by many wearers.

The invention will now be described in further detail with reference to specific embodiments shown in the drawings.

DETAILED DESCRIPTION OF THE PREFERRED EMBODIMENTS

Figure 1:
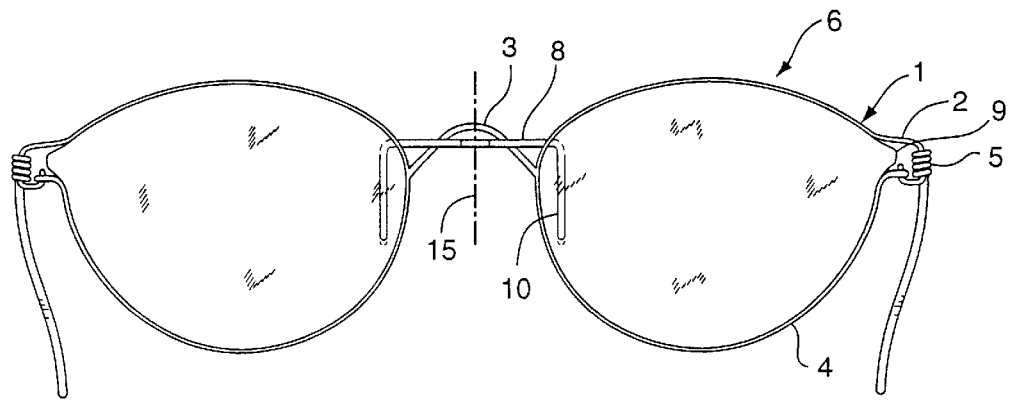
FIG. 1 is a front view of a pair of spectacles provided with a shield according to a first embodiment of the invention.

All figures are schematic and not necessarily to scale and illustrate only details essential to the understanding of the invention while other details have been omitted. In all figures the same reference numerals are used to designate identical or corresponding parts.

Reference is first made to FIG. 1 which illustrates a pair of spectacles 1 comprising a frame 2 which holds two lenses 4 and fitted with a shield 6 according to a first embodiment of the invention. As explained above, the frame comprises a connecting bridge or a nose bridge 3 and hinges 5 for the temple bars. The spectacles are symmetrical about the plane of symmetry indicated with the dash-dotted line 15. The spectacles are shown exclusively to illustrate how the shield is fitted but they are not a part of the invention.

The shield assembly designated as a whole by the reference numeral 6 comprises two shield lenses 7 and a connecting bridge or nose bridge 8 which secures the position of the shield lenses relative to each other. Preferably the shield is symmetrical about a symmetrical plane which, in the intended position, coincides with the symmetrical plane 15 of the spectacles. The shield lenses may be made of glass or—more commonly—tinted or coated plastics adapted to provide the desired optical properties. At their peripheral rims, the shield lenses 7 are provided with guide pins 9 arranged at the regions adapted to be located adjacent the hinges 5 for the temple bars.

The connecting bridge 8 of the shield is made of a segment of wire 11 which, in the embodiment shown in FIG. 1, extends horizontally from one lens to the other, and the ends of which are angled substantially vertically downwards, the downward legs thus forming spacer elements 10.

Figure 2:
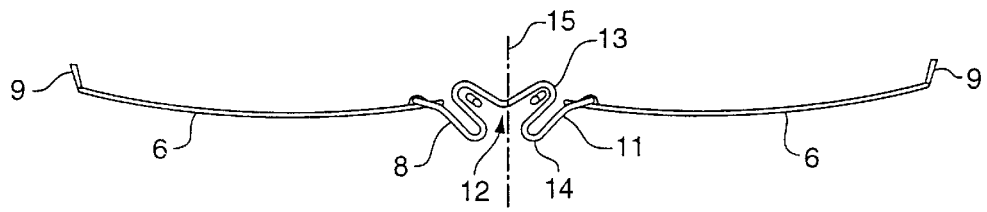
FIG. 2 is a horizontal sectional view through the shield according to a first embodiment of the invention.

FIG. 2 is a planar, sectional view of the shield and it appears how the shield lenses 7 extend in an arched manner and how the wire segment 11 which forms the connecting bridge is winded, the central portion forming an angle with a forwardly oriented apex, i.e. downwardly oriented in FIG. 2. This apex constitutes the engagement tongue 12 of the shield. Further away from the symmetrical plane 15, the wire segment 11 extends through a substantially U-shaped bend where the concave portion of the U points in a forwardly and centrally inclining direction. In the following, this bend is designated the saddle bend 13 since it serves to provide an area which may straddle on the connecting bridge 3 of the spectacles as indicated by the dotted line in FIG. 2.

FIG. 2 further illustrates the guide pins 9 at the outer margins of the shield lenses arranged to point backwards relative to the shield lenses. In a preferred embodiment the guide pins are implemented in the form of angled extensions of the shield lenses.

The wire segment continues in a forwardly inclining manner in an oppositely oriented U-shaped bend from where it continues in a direction inclined backwards and outwards. This bend, the convex portion of which faces forwards and towards the symmetrical plane, is designated the finger bend 14 as it serves the purpose of providing an engagement point for the fingers when the shield is to be fitted or detached, or when the spectacles are to be pushed upwards. From the finger bend 14 the wire segment continues to a point behind the respective shield lens 7 slightly within its rim. As mentioned, the wire segment is at this point bent to a right angle, the end portion extending downwards. The wire is secured to the shield lens 7 at its vertical leg which constitutes a spacer element 10 defining the minimum distance of the shield lens relative to the lens in this point.

Without departing from the scope of the invention, the securing of the wire to the shield lens may be effected in a number of known ways. According to one embodiment a hollow socket is glued to the back of the lens and the wire is threaded through the socket and secured e.g. by bending of a protruding end. According to an alternative embodiment a hollow socket is secured to the shield lens by means of pins or protrusions which extend through recesses in the shield lens. In a third embodiment the wire is bent and extends through suitable holes in the shield lens, optionally back and forth. Other positionings and fastening means are also possible.

A friction surface may be realised by making the socket from a friction material or by coating portions of the wire with a friction material or by providing portions of the shield lens with a friction coating.

As will appear from FIGS. 2 and 1, the spacer element is arranged fairly close to the innermost rim of the respective shield lens whereas the remainder of the lens surface is devoid of spacer elements which consequently allows for spot or area contact between shield lenses and frame or lenses.

In the preferred embodiment, the wire is made from a resilient material which may be bent into the described shape. Suitable materials comprise alloys of titanium, aluminium, gold, etc. Other suitable materials may be suggested by a person skilled in the art.

Figure 3:
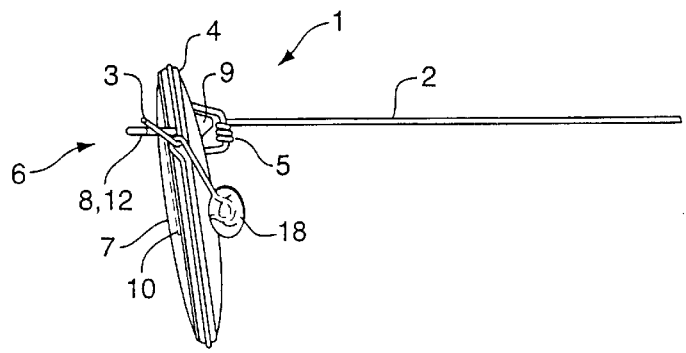
FIG. 3 is a vertical sectional view along the symmetrical plane of the spectacles showing the spectacles with the shield illustrated in FIG. 1.

The vertical sectional view in FIG. 3 illustrates the same components as the ones described in connection with FIGS. 1 and 2, and also describes in further detail how the connecting bridge 3 of the spectacles inclines upwards and forwards which is convenient for the establishment of a harmonious connection above the nose of the wearer. Moreover, a nose support plane 18 is illustrated in connection with the frame which is designed to abut on the side of the wearer's nose.

In the clipped-on state of the shield where the engagement tongue 12 and the wire surfaces are arranged between the engagement tongue and the saddle bends 13, its connecting bridge abuts on the connecting bridge of the spectacles. A forward force in the this area which is transmitted from the connecting bridge of the shield accessory to that of the spectacles will thus cause the engagement tongue 12 to move upwards towards the centre of the arched connecting bridge 3 of the spectacles. A forward force thus centers the shield and determines its position against the bottom of the nose bridge.

The shield is clipped off by forcing the engagement tongue 12 backwards against the spring force while simultaneously moving the shield upwards. The shield is clipped on by forcing it downwards from above whereby the engagement tongue is forced backwards to pass behind the connecting bridge of the spectacles until it moves forward below in a snap-locking engagement.

In the preferred embodiment, the spring force is provided by making the wire 11 from a resilient material. Additional spring force may be obtained by making the shield lenses 7 from a resilient material and further by coating the spacer elements 10 with a soft coating material or a resilient padding element or the like. According to the invention the requisite resilience may be provided by any of these means alone or by any mutually complementary combinations thereof. The essential aspect of the invention lies solely in the provision of a resilient biasing force which is directed towards the connecting bridge 3 of the spectacles and which provides a backward abutment pressure which maintains the shield lenses 7 in their firm abutment on the spectacles.

In the preferred embodiment, the wire 11 is provided with a coating or a soft padding in the area where it abuts on the connecting bridge of the spectacles. This serves the purpose of protecting the frame and is not illustrated in the drawings since it is considered within the art to provide such coatings.

FIG. 3 illustrates how the hinge 5 of the frame is provided with two backwardly oriented branches while the guide means 9 of the shield lens comprises a single pin arranged between the two said branches to allow it to be controlled in an upward as well as a downward direction. However, it is within the scope of the invention to vary these guide pins, e.g. in such a manner that a guide pin abuts on the top surface of the hinge, that a guide pin comprises two protrusions—one engaging the top surface and one engaging the bottom surface of the hinge—, or that the guide pins are arranged in other places than adjacent the hinges of the temple bars. According to alternative embodiments, the guide pins may optionally be omitted altogether and thus the shield lenses may be controlled exclusively by the friction abutment of the lenses, the spacer elements 10 or optionally by supplementary friction abutment with supplementary friction elements in other places (not shown in further detail).

Figure 4:
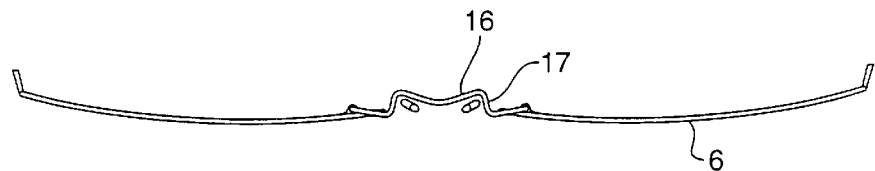
FIG. 4 is a horizontal sectional view corresponding to FIG. 2, but illustrating a shield according to a second embodiment of the invention.

Reference is now made to FIG. 4 which is a horisontal, sectional view corresponding to the one illustrated in FIG. 2 but showing a shield 19 according to a second embodiment. The shield according to this embodiment is different in the way in which the the connecting wire extends, since, instead of being U-shaped in the area between the shield lenses, the connecting bridge 16 according to this embodiment has two angular bends on either side of the symmetrical plane, the central branch between two angles being referred to as the support leg, reference numeral 17. The support leg 17 limits the movement of the shield downwards during fitting.

In this embodiment, the U-bends are omitted which is possible because the shield is forced forwards, as explained above, in the area around the connecting bridge by the pressure between shield lenses or optionally spacer elements and the spectacles.

Thus, the fitting of the shield according to this embodiment fully matches that of the shield illustrated in FIG. 2, the most essential difference to the wearer being only that the embodiment shown in FIG. 4 does not involve the large finger bends 14. The connecting wire of the embodiment shown in FIG. 4 having a shorter total length, however, its spring characteristics must of course be somewhat adjusted to obtain a resilience similar to what is obtained with the wire illustrated in FIG. 2. Such adaptation is considered obvious to a person skilled in the art.

Figure 5:
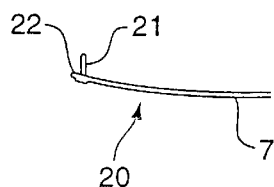
FIG. 5 is a horizontal sectional view through a portion of a shield according to a third embodiment of the invention.

Reference is now made to FIG. 5 which illustrates a portion of a shield according to a third embodiment of the invention in a horizontal sectional view. The shield according to the third embodiment differs from the one according to the first embodiment by the arrangement of the guide pins, the guide pins 20 according to the third embodiment being implemented in the form of separate rivet-like pins 21 fitted in bores 22 through the shields. The pins 21 may be press-fitted or adhered into position.

The shield according to the third embodiment has a distinct advantage in the ready possibility of fitting customized lengths of pins whereby the shield may very easily be tailored to suit different spectacles. Alternatively the shield could be supplied from the manufacturer with pins of a standard size, selected to be comparatively long, and allowing the optometrist or the user the possibility of cutting the pins to the desired length. This is important in case of spectacles with a more pronounced curving of the lens front surfaces, where the guide pins have to bridge a comparatively wide gap in order to reach engagement with the hinge section of the frame. Other methods of fitting guide pins to the shield lenses may be suggested by those skilled in the art.

Although specific embodiments have been described above to illustrate the invention, it is to be understood that such embodiments are exemplary only and not in any way intended to limit the invention which may be widely varied by a person skilled in the art without departing from the scope of the appended claims.

What is claimed is:

1. A clip-on shield for spectacles, which spectacles comprise a spectacle connecting bridge, a spectacle frame and a pair of spectacle lenses, said shield comprising a pair of shield lenses, a clip-on device adapted for selective securing of said shield to the spectacle connecting bridge to allow occasional use of said shield in combination with the spectacles, a shield connecting bridge, structurally connected with said pair of shield lenses and provided with an engagement tongue which engages behind the spectacle connecting bridge, and is designed to transmit a force from the pair of shield lenses, which force is oriented centrally relative to the symmetrical plane of the spectacles, respective spacer means adjacent each shield lens of said pair of shield lenses, said spacer means comprising a respective coating or soft padding providing a friction surface adapted to abut on the front of the spectacles, and a spring means arranged for biasing said engagement tongue against the back of the spectacle connecting bridge and each said shield lens towards the front of the spectacle frame or spectacle lenses in such a manner that the orientation and positioning of said shield is determined by the abutment of said friction surfaces on the front of the spectacles.

2. The shield according to claim 1, wherein said engagement tongue is designed for abutment on a top surface of the spectacle connecting bridge and for restricting the downward movement of said shield.

3. The shield according to claim 1, wherein said engagement tongue is designed for snap-locking engagement behind the spectacle connecting bridge by fitting from above.

4. The shield according to claim 1, wherein said shield connecting bridge is provided with a soft coating or padding on the portion which extends behind and optionally below the spectacle connecting bridge.

5. The shield according to claim 1, wherein each of said spacer means comprises a spacer element adapted for engaging the spectacle lenses and for ensuring a minimum distance between a respective shield lens and a respective spectacle lens in an area adjacent said spacer element.

6. The shield according to claim 1, wherein said connecting bridge comprises a wire of a resilient material.

7. A clip-on shield for spectacles, which spectacles comprise a spectacle connecting bridge, a spectacle frame and a pair of spectacle lenses, said shield comprising
  a pair of shield lenses, a clip-on device adapted for selective securing of said shield to the spectacle connecting bridge to allow occasional use of said shield in combination with the spectacles,
  a shield connecting bridge, structurally connected with said pair of shield lenses and provided with an engagement tongue which engages behind the spectacle connecting bridge, and is designed to transmit a force from the pair of shield lenses, which force is oriented centrally relative to the symmetrical plane of the spectacles,
  a respective spacer means adjacent each shield lens of said pair of shield lenses, said spacer means comprising a respective coating or soft padding providing a friction surface adapted to abut on the front of the spectacles,
  spring means arranged for biasing said engagement tongue against the back of the spectacle connecting bridge and each said shield lens towards the front of the spectacle frame or spectacle lenses in such a manner that the orientation and positioning of said shield is determined by the abutment of said friction surfaces on the front of the spectacles and
  supplementary guide pins at portions of said shield lenses spaced from said shield connecting bridge, said guide pins being adapted for controlling the positioning of the respective shield lenses upwards and downwards by engagement with parts of the spectacles.

8. The shield for spectacles according to claim 7, wherein said guide pins comprise rivet-like pins, each fitted in bores through a respective one of said shield lenses.

9. A shield for spectacles, which spectacles comprise a spectacle frame, a pair of spectacle lenses and a spectacle connecting bridge between the lenses in the form of a substantially upwardly and forwardly inclining arched bow and with temple bars, said shield comprising
  a pair of shield lenses,
  a shield connecting bridge adapted to straddle on the bow by virtue of two engagement areas which are mutually symmetrical about the symmetrical plane of the spectacles and in such a manner that each said engagement area presents a substantially U-shaped engagement abutting on the front, the back and the outside of the bow,
  a locking tongue which engages below the bow somewhere between the engagement areas, and
  respective spacer means adjacent each shield lens of said pair of shield lenses, said spacer means comprising a respective coating or soft padding providing a friction surface adapted to abut on the front of the spectacles.

10. The shield according to claim 9, wherein said engagement tongue is designed for snap-locking engagement behind the spectacle connecting bridge by fitting from above.

11. The shield for spectacles according to claim 9, wherein said shield connecting bridge is provided with a soft coating or padding at said engagement areas.

12. The shield according to claim 9, wherein each said spacer means comprises a spacer element adapted for engaging the spectacle lenses and for ensuring a minimum distance between a respective shield lens and a respective spectacle lens in an area adjacent said spacer element.

13. The shield according to claim 9, wherein said connecting bridge comprises a wire of a resilient material.

14. A shield for spectacles, which spectacles comprise a spectacle frame, a pair of spectacle lenses and a spectacle connecting bridge between the lenses in the form of a substantially upwardly and forwardly inclining arched bow and with temple bars, said shield comprising
  a pair of shield lenses,
  a shield connecting bridge adapted to straddle on the bow by virtue of two engagement areas which are mutually symmetrical about the symmetrical plane of the spectacles and in such a manner that each said engagement area presents a substantially U-shaped engagement abutting on the front, the back and the outside of the bow,
  a locking tongue which engages below the bow somewhere between the engagement areas,
  respective spacer means adjacent each shield lens of said pair of shield lenses, said spacer means comprising a respective coating or soft padding providing a friction surface adapted to abut on the front of the spectacles, and
  supplementary guide pins at portions of said shield lenses which are adapted to be located adjacent the temple bars, said guide pins being adapted for controlling the positioning of the respective shield lenses upwards and downwards by engagement with parts of the spectacles.

15. The shield for spectacles according to claim 14, wherein said guide pins comprise rivet-like pins, each fitted in bores through a respective one of said shield lenses.

* * * * *